US 8,304,106 B2
(45) Date of Patent: Nov. 6, 2012

(12) United States Patent
Yoshida et al.

(10) Patent No.: US 8,304,106 B2

(54) HERMETIC CELL AND METHOD FOR PRODUCING SAME

(75) Inventors: Satoshi Yoshida, Moriguchi (JP); Tomokazu Yamanaka, Moriguchi (JP)

(73) Assignee: SANYO Electric Co., Ltd., Moriguchi-shi, Osaka (JP)

( * ) Notice: Subject to any disclaimer, the term of this patent is extended or adjusted under 35 U.S.C. 154(b) by 1214 days.

(21) Appl. No.: 11/965,056

(22) Filed: Dec. 27, 2007

(65) Prior Publication Data

US 2008/0160234 A1     Jul. 3, 2008

(30) Foreign Application Priority Data

Dec. 27, 2006   (JP) ................. 2006-351904

(51) Int. Cl.
*H01M 2/02* (2006.01)
*H01M 10/04* (2006.01)
(52) U.S. Cl. ............ 429/163; 29/623.2; 429/178
(58) Field of Classification Search .......... None
See application file for complete search history.

(56) References Cited

U.S. PATENT DOCUMENTS

2006/0207085 A1   9/2006   Nakagawa et al.
2007/0128514 A1   6/2007   Yoshida

FOREIGN PATENT DOCUMENTS

| JP | 2002-292486 A | 10/2002 |
|---|---|---|
| JP | 2004-235082 A | 8/2004 |
| JP | 2005-116208 A | 4/2005 |
| JP | 2006-019089 A | 1/2006 |
| JP | 2006-260883 A | 9/2006 |
| JP | 2007-157519 A | 6/2007 |

OTHER PUBLICATIONS

Machine Translation of JP 2002-292486.*

* cited by examiner

*Primary Examiner* — Barbara Gilliam
*Assistant Examiner* — Robert S Carrico
(74) *Attorney, Agent, or Firm* — Westerman, Hattori, Daniels & Adrian, LLP

(57) ABSTRACT

A hermetic cell excellent in weld strength is provided. The hermetic cell includes an can having an opening and a seal for sealing the opening of the can. A portion of engagement of the seal with the opening of the can is welded with a high energy beam, thereby hermetically sealing the can. At least one portion of a melt mark resulting from the high energy beam welding has a top surface having a lowermost point lower in a direction of a bottom of the can than a lowermost point of a top surface of an adjacent portion of the melt mark. The at least one portion of the melt mark has a bottom surface having a lowermost point lower in the direction of the bottom of the can than an lowermost point of a bottom surface of the adjacent portion of the melt mark.

4 Claims, 5 Drawing Sheets

Shadowed portion : lower portion of the melt mark 30
Plain portion : usual portion of the melt ark30

(a)

(b)

Corner pressed portion

Terminal lateral portion T

HERMETIC CELL AND METHOD FOR PRODUCING SAME

BACKGROUND OF THE INVENTION

1) Field of the Invention

The present invention relates to technology for enhancement of the weld strength of hermetic cells.

2) Description of the Related Art

Rectangular hermetic cells are easy to mount inside electronic appliances and thus used for power sources therefor.

These hermetic cells are prepared by engaging a top plate assembly with an opening portion of the can and laser welding the portion of engagement in a hermetic manner. If the weld strength is not sufficient, cracking may occur on the melt mark when the cell is dropped, which causes leakage of the electrolytic solution and infiltration of oxygen or moisture into the cell, thus adversely affecting degraded cell performance.

A possible solution to this problem is to increase the laser strength to enlarge the depth of melting of the melt mark caused by the laser, thereby enhancing the weld strength by enlarging. However, this poses the problems of occurrence of sputtering and early degradation of the laser apparatus.

The technology for enhancement of the weld strength is disclosed in Japanese Patent Application Publication No. 2002-292486 (patent document 1), Japanese Patent Application Publication No. 2006-19089 (patent document 2), and Japanese Patent Application Publication No. 2006-260883 (patent document 3).

Patent document 1 discloses a technique to make the reflectivity of laser light lower on the sealing cover than on the can. This inhibits degradation of the sealing performance of the laser welded portion.

Patent document 2 discloses a technique concerned with the spot melt mark made as a result of laser welding of the can and the sealing plate. A cross section of the melt mark parallel to the length of the can and providing the shortest distance between the outer surface of the can and the sealing plate is protruded in a mountainous shape in the outward direction relative to the can from the bottom of the spot melt mark, and the peak of the mountainous protrusion is positioned further toward the inner surface of the sealing plate than a plane encompassing the outer surface of the sealing plate. This enhances the weld strength.

Patent document 3 discloses a technique including the steps of: preparing a rectangular case having an opening portion with a cross section such that the outer surfaces of the side walls of the case defining an opening portion are linear, and that in the side walls having the longest linear outer surfaces among the side walls defining the opening portion, the center portion of each side wall is thicker than both ends of the side wall; locating a sealing member to a position to seal the opening portion, the sealing member being large enough to cover the opening portion; and welding the sealing member onto the case by irradiating the boundary between the sealing member and the side walls at the periphery of the opening portion with high-density energy from a side direction of the case while varying the depth of melting in the thickness direction of the side walls in accordance with the thickness of the side walls. This enhances the weld strength.

SUMMARY OF THE INVENTION

The present invention has been accomplished in view of the above inconveniences, and it is an object of the present invention to provide a hermetic cell excellent in weld strength and a method for producing the cell.

In order to accomplish the above-mentioned objects, a hermetic cell according to the present invention includes: a can having an opening; and a seal for sealing the opening of the can. A portion of engagement of the seal with the opening of the can is welded with a high energy beam, thereby hermetically sealing the can. At least one portion of a melt mark resulting from the high energy beam welding has a top surface having a lowermost point lower in a direction of a bottom of the can than a lowermost point of a top surface of an adjacent portion of the melt mark. At least one portion of the melt mark has a bottom surface having a lowermost point lower in the direction of the bottom of the can than an lowermost point of a bottom surface of the adjacent portion of the melt mark.

With the above-described configuration, a part of the melt mark is positioned lower in the direction of the bottom of the can than an adjacent part of the melt mark, which means that at the lower part of the melt mark the welding is carried out to a deep level. Thus, on application of external force, propagation of the force becomes discontinuous at this position to inhibit overall deformation of the welded portion, thereby significantly improving the weld strength.

The melt mark, as used herein, refers to a mark of region (three-dimensional range of melting) melted as a result of high energy beam, which can be perceived by observing the appearance or cross section of the mark.

In the above-described configuration, the lowermost point of the top surface of the at least one portion of the melt mark is from 0.05 to 0.2 mm lower in the direction of the bottom of the can than the lowermost point of the top surface of the adjacent portion of the melt mark, and the lowermost point of the bottom surface of the at least one portion of the melt mark is 0.1 mm or more than 0.1 mm lower in the direction of the bottom of the can than the lowermost point of the bottom surface of the adjacent portion of the melt mark.

With the above-described configuration, the melt strength is further increased. It should be noted that the values 0.05 mm and 0.1 mm are far more than variations of welding position during usual high energy beam welding.

In the above-described configuration, the can may be rectangular, and at least a corner portion of the portion of engagement subjected to the high energy beam welding may have the lower portion of the melt mark.

In the above-described configuration, the can may be rectangular, an external electrode terminal may be provided in a center portion of the seal, and the lower portion of the melt mark is formed in a terminal lateral portion (T) of the seal.

The corner portion of a cell using a rectangular can is liable to collective force, and at the terminal lateral portion (T) of the seal, a resin member for holding the terminal is thermally influenced. Therefore, enhancing the weld strength by increasing the laser output at these portions is difficult in many cases. This causes a tendency toward degraded weld strength at these portions. If welding is carried to a deep level at these portions, the weld strength is drastically enhanced. The lower portion of the melt mark may be formed not only on the corner portion and the terminal lateral portion, but also on the overall engagement portion of the can and the seal.

The corner portion, as used herein, refers to any of four-corner adjacent regions of the opening portion of the rectangular can, as shown in FIG. 2. The terminal lateral portion (T), as used herein, refers to a region beside an electrode terminal 4 in the range of from the lengths L to 3L (L=the length of the electrode terminal 4).

In order to accomplish the above-mentioned objects, a method for producing a hermetic cell according to a first aspect of the present invention comprises the steps of: forming a dent portion on a top of an opening of an can, the dent portion being dented axially inwardly; engaging a seal with the can having the dent portion so that a periphery of an outer surface of the seal and an upper end of the dent portion of the can are on the same plane; and subjecting a portion of engagement of the seal with the opening of the can to high energy beam welding.

In order to accomplish the above-mentioned objects, a method for producing a hermetic cell according to a second aspect of the present invention comprises the steps of: forming a dent groove on a periphery of an outer surface of a sealing plate, the dent groove being extensive inwardly from outer edge of the seal; engaging the sealing plate having the dent groove with an opening of an can so that a top surface of a periphery of the sealing plate and an upper end of the opening of the can are on the same plane; and subjecting a portion of engagement of the sealing plate and the opening of the can to high energy beam welding.

In order to accomplish the above-mentioned objects, a method for producing a hermetic cell according to a third aspect of the present invention comprises the steps of: forming a dent portion on a top of an opening of an can, the dent portion being dented axially inwardly; forming a dent groove on a periphery of an outer surface of a sealing plate, the dent groove being extensive inwardly from outer edge of the seal; engaging the can having the dent portion with the sealing plate having the dent groove so that an upper end of the dent portion of the can and an outer surface of the sealing plate are on the same plane; and subjecting a portion of engagement of the can and the sealing plate to high energy beam welding.

With these configurations, when the engagement portion is irradiated with high energy beam (e.g., laser), the portion provided with the dent portion and/or dent groove obtains thermal melting to a deeper level (to a lower position in the direction of the bottom of the can) than other portions. Thus, forming a dent portion and/or dent groove on a portion in need of large weld strength enables it to enhance the weld strength of that portion by using high energy beam of uniform strength. Thus, with these configurations, a hermetic cell having necessary and sufficient weld strength can be produced without unnecessary thermal damage to the power generating elements and other constituents.

The melt mark formed on the portion provided with the dent portion and/or dent groove has a top surface having a lowermost point lower in the direction of the bottom of the can than a lowermost point of a top surface of an adjacent portion of the melt mark, and the melt mark has a bottom surface having a lowermost point lower in the direction of the bottom of the can than an lowermost point of a bottom surface of the adjacent portion of the melt mark.

As used herein, "a periphery of an outer surface of the seal and an upper end of the dent portion of the can are on the same plane," "a top surface of a periphery of the sealing plate and an upper end of the opening of the can are on the same plane," and "an upper end of the dent portion of the can and an outer surface of the sealing plate are on the same plane" refer to making the top surfaces of portions without the dent portion and dent groove agree. When the can and the seal are to be provided with a dent portion and dent groove, the positions of the dent portion and dent groove are also preferable made to agree. The dent portion and dent groove may be formed by, for example, cutting, pressing, and chemical surface processing.

The dent portion may be provided on the entirety or a part of the top end of the opening of the can. The dent groove may be provided on the entirety or a part of the periphery of the outer surface of the seal. As described above by referring to the hermetic cell, at least the corner portion and the terminal lateral portion are preferably provided with a dent portion or dent groove.

In the first to third aspects of the present invention, widths L1 of the dent portion and the dent groove may be from 0.1 to 0.2 mm, depths L2 of the dent portion and the dent groove may be from 0.05 to 0.1 mm, a distance L3 between dent portions and a distance L3 between dent grooves may be from 0.5 to 1.0 mm, and a length L4 of the dent groove may be from 0.2 to 0.6 mm.

If the widths L1 of the dent portion and the dent groove are less than 0.1 mm, the spot melt mark cannot be sufficiently formed at a position lower in the direction of the bottom of the can. If the widths L1 of the dent portion and the dent groove are more than 0.2 mm, the melt mark formed at a position lower in the direction of the bottom of the can becomes continuous, creating the possibilities of occurrence of sputtering and thermal damage to the power generating elements. If the depths L2 of the dent portion and the dent groove are less than 0.05 mm, the depth of the melt mark is insufficient, thus failing to improve the weld strength sufficiently. If the depths L2 of the dent portion and the dent groove are more than 0.1 mm, the focus of the high energy beam is largely dispositioned off the irradiation surface, thus making high strength welding difficult. If the distance L3 between the dent portions and the distance L3 between the dent grooves are less than from 0.5 mm, the melt mark formed at a position lower in the direction of the bottom of the can becomes continuous, creating the possibility of large thermal damage to the power generating elements. If the distance L3 between the dent portions and the distance L3 between the dent grooves are more than from 1.0 mm, the melt mark formed at a position higher in the direction of the bottom of the can becomes continuous, thus making insufficient the effect of improving the weld strength. If the length L4 of the dent groove is excessively short, a melt mark with sufficient strength cannot be formed. In view of this, the above-specified ranges are preferred.

DESCRIPTION OF PREFERRED EMBODIMENTS

Figure 1:
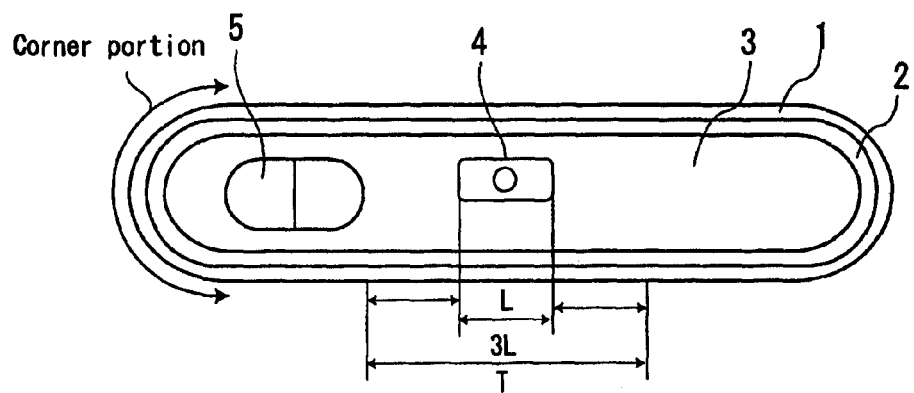
FIG. 1 is a plan view of a cell according to the present invention.

Preferred embodiments of the present invention will be described below in conjunction with the drawings. FIG. 1 is a plan view of a cell according to the present invention, FIG. 2(a) is a cross sectional view of the periphery of the seal of the cell according to the present invention, FIG. 2(b) is an enlarged phantom view of main portions of the portion of engagement of the seal and the opening portion of the can, and FIG. 3 is an enlarged view of main portions of the portion of engagement of a seal and the opening portion of the can before welding.

As shown in FIG. 1, a hermetic cell according to the present invention has power generating elements and an electrolytic solution housed in an can 1. A periphery portion (flange) 2 of a seal 3 is engaged with the opening portion of the can, and the portion of engagement is welded with high energy beam (e.g., laser). The seal 3 has an electrode terminal 4 and a safety valve 5.

Figure 3:
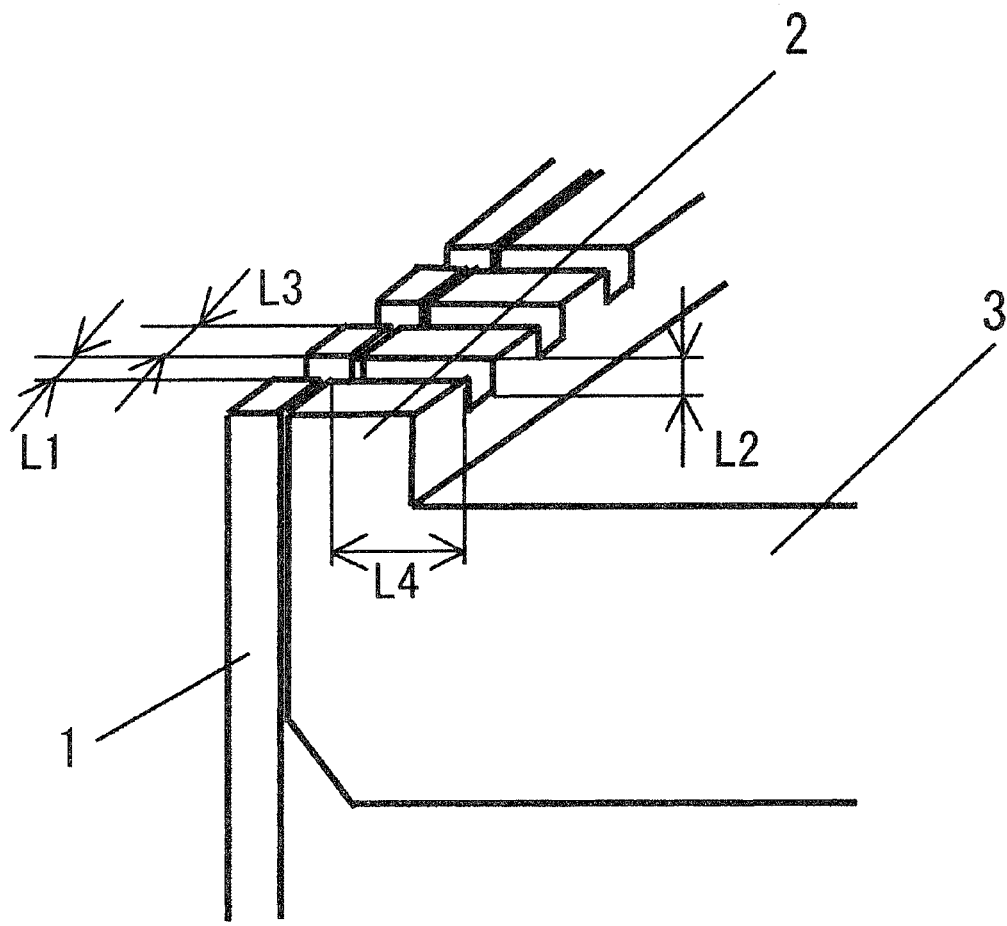
FIG. 3 is an enlarged view of main portions of the portion of engagement of a seal and the opening portion of the can before welding.
Figure 4:
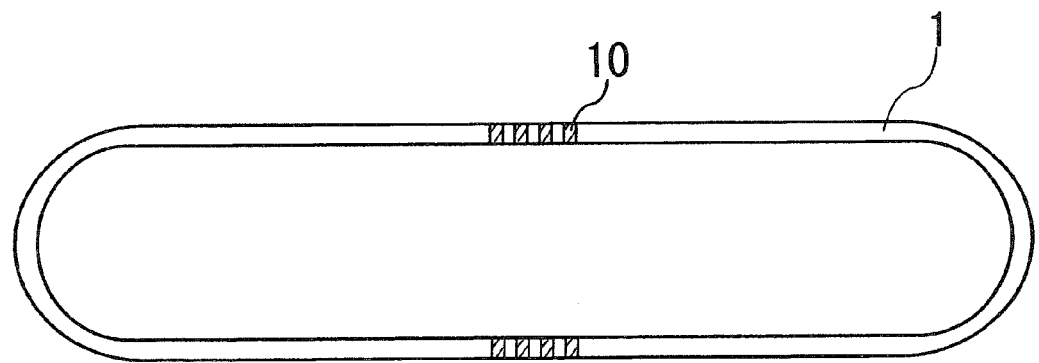
FIG. 4 is a plan view of the seal used in the cell according to the present invention.
Figure 5:
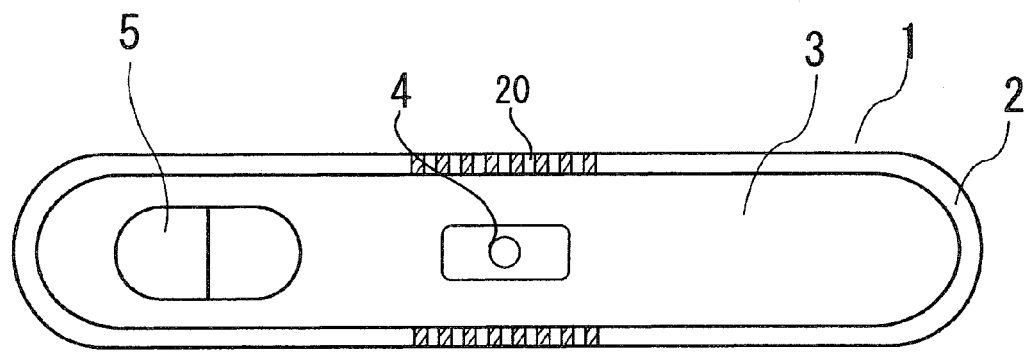
FIG. 5 is a plan view of the can used in the cell according to the present invention.

The can 1 has dent portions 10 formed on top of the opening of the can 1 and dented inwardly in the axial direction of the can 1, as shown in FIG. 4. The seal 3 has dent grooves 20 formed on the periphery portion (flange) 2 on the outer surface of the seal 3 and internally extensive from peripheral edge of the flange portion 2, as shown in FIG. 5. With the use either the dent portions 10 or the dent grooves 20, or both of them, the hermetic cell is prepared by: engaging the seal 3 with the opening portion of the can 1 so that the upper ends of the dent portions 10 and the outer surface of the seal 3 are on a common plane, as shown in FIG. 3; and subjecting the portion of engagement to high energy beam (e.g., pulse laser).

Figure 2:
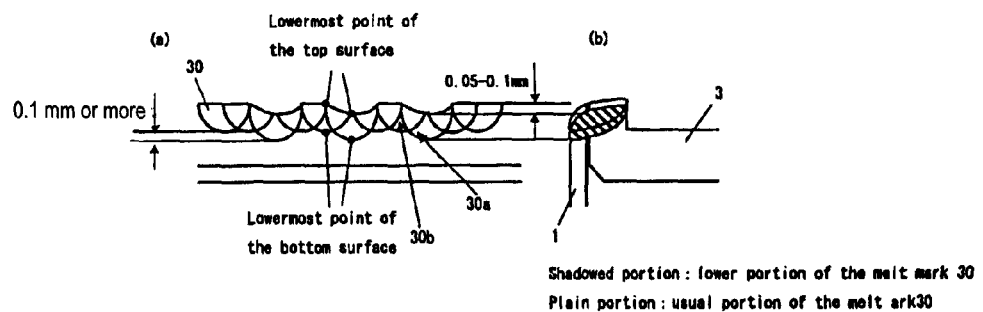
FIG. 2(*a*) is a cross sectional view of the periphery of the seal of the cell according to the present invention, and FIG. 2(*b*) is an enlarged phantom view of main portions of the portion of engagement of the seal and the opening portion of the can.

As shown in FIG. 2, at least a part 30a of the melt mark 30 resulting from the welding is lower in the direction of the bottom of the can than an adjacent part 30b of the melt mark 30. With this structure, as shown in FIG. 2, a part of the melt mark has a large depth of melting as represented by the part 30a, thereby significantly improving the weld strength.

Experiment 1

Measurement of Strength of the Negative Electrode Terminal Against Lateral Pressing As shown in FIG. 4, on the upper end of the opening of the can having a 10 mm terminal lateral portion T, dent portions 10 dented axially inwardly were formed. The width L1 of each of the dent portions 10 shown in FIG. 3 is 0.2 mm, the depth L2 is 0.1 mm, and the distance L3 between the dent portions 10 is 1.0 mm. The seal 3 was engaged with the can 1 having the dent portions 10 so that the periphery of the outer surface of the seal and the upper end of the opening of the can would be on the same plane. Then, the portion of engagement was welded with laser, thus preparing five dummy cells 1. While each of the dummy cells 1 housed an electrode assembly composed of the positive and negative electrodes and the separator, no electrolytic solution was contained in each cell. Also, no processing was made to the periphery portion (flange) 2 of the seal 3.

As shown in FIG. 5, on the periphery of the seal 3 having a 10 mm terminal lateral portion, dent grooves 20 internally extensive from peripheral edge of the flange portion 2 were formed. The width L1 of each of the dent grooves 20 shown in FIG. 3 is 0.2 mm, the depth L2 is 0.1 mm, the distance L3 between the dent grooves 20 (eleven dent portions on each side of the terminal lateral portion) is 1.0 mm, and the length L4 of each of the dent grooves 20 is 0.4 mm (equivalent to the thickness of the flange portion 2 of the seal 3). The seal 3 was engaged with the opening of the can 1 so that an imaginary ceiling surface of the opening of the can 1 and the ceiling surface of periphery of the seal 3 would be on the same plane. Then, the portion of engagement was welded with laser, thus preparing five dummy cells 2. While each of the dummy cells 2 housed an electrode assembly composed of the positive and negative electrodes and the separator, no electrolytic solution was contained in each cell. Also, no processing was made to the opening of the can 1.

For comparison, five comparison cells 1 were prepared each having an can without dent portions on the upper end of the opening of the can and having a seal without dent grooves on the periphery thereof.

Figure 6:
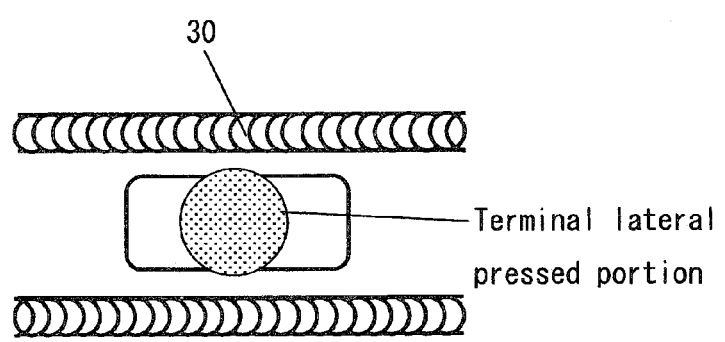
FIG. 6 is a plan view of a cell after welding in Experiment 1.

As shown in FIG. 6, the electrode terminals of the dummy cells 1 and 2 and the comparison cell 1 were pressurized with a cylindrical rod having a diameter of 3 mm in order to measure the pressing strength of the laser-welding sealed portion (i.e., a level of load at which the laser-welding sealed portion was broken). The results are shown in Table 1.

TABLE 1

|  | Dummy cell 1 | Dummy cell 2 | Comparative cell 1 |
| --- | --- | --- | --- |
| Cell a | 360 N (331-414) | 355 N (340-363) | 269 N (244-291) |
| Cell b | 424 N (421-426) | 430 N (420-435) | 363 N (348-390) |

Average (minimum-maximum)

In Table 1, the cell a has a thickness of 4.6 mm, a width of 34 mm, a height of 50 mm, and the cell b has a thickness of 5.5 mm, a width of 34 mm, and a height of 50 mm.

Table 1 shows that the weld strengths of the dummy cells 1 and 2 of the present invention are 355 N and 360 N for the cells a and 424 N and 430 N for the cells b, which are respectively superior to 269 N and 363 N for the comparative cells 1.

Figure 9:
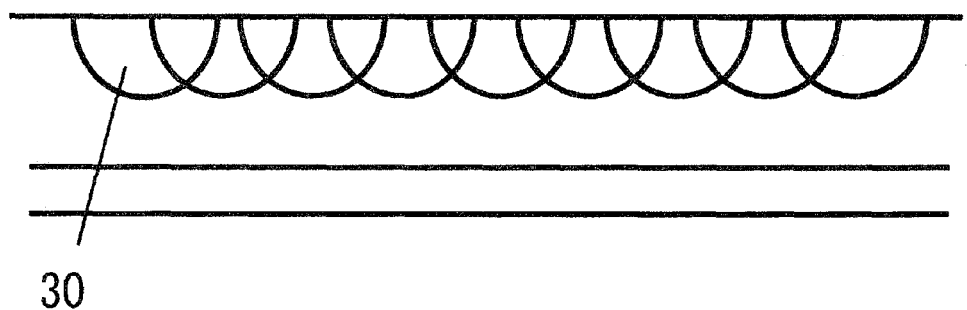
FIG. 9 is a cross sectional view of the periphery of a seal of a conventional cell.

Here is a possible explanation. Since the dummy cells of the present invention have dent portions on the cans or dent grooves on the flange portions of the seals, the joint of the can and the seal has a partially deep portion as shown in FIG. 2. This makes discontinuous the transmission of external force at this portion to inhibit the deformation of the overall welded portion, resulting in a significant improvement in weld strength. In the comparative cell 1, since the depth of welding is substantially uniform as shown in FIG. 9, external force transmits evenly throughout the welded portion, which makes the welded portion easy to be torn. Thus, sufficient weld strength cannot be obtained.

Experiment 2

Measurement of Strength Against Pressing on the Corner Portion

Figure 7:
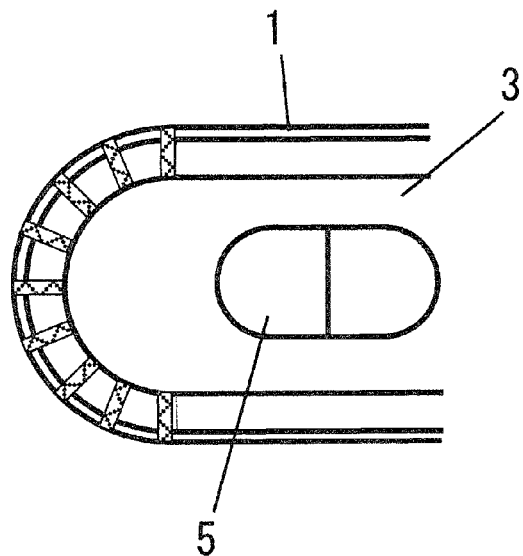
FIG. 7(*a*) is a plan view of a cell before welding in Experiment 2, and FIG. 7(*b*) is a plan view of a cell after welding in Experiment 2.
Figure 7:
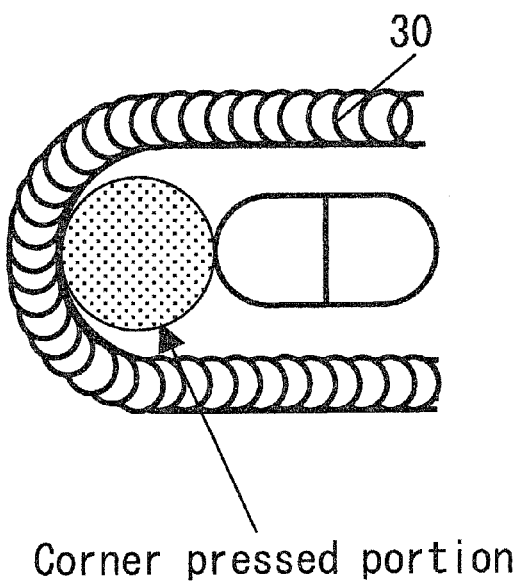

As shown in FIG. 7(a), on the upper end of the opening of the can, dent portions dented axially inwardly were formed, and dent grooves were formed on the periphery of the outer surface of the seal. For each of the dent portions and the dent grooves, the width L1 shown in FIG. 3 is 0.2 mm, the depth L2 is 0.1 mm, and the distance L3 between the dent portions and between the dent grooves is 1.0 mm. The seal was engaged with the opening of the can so that the outer surface of the sealing plate and the upper end of the opening of the can would be on the same plane. Then, the portion of engagement was welded with laser, thus preparing three dummy cells 3 each having a thickness of 65 mm, a width of 34 mm, and a height of 50 mm. While each of the dummy cells 3 housed an electrode assembly composed of the positive and negative electrodes and the separator, no electrolytic solution was contained in each cell.

For comparison, five comparison cells 2 were prepared each having an can without dent portions on the upper end of the opening of the can and having a seal without dent grooves on the periphery thereof.

Each of the corner portion of each of the dummy cells 3 and the comparison cell 2 as shown in FIG. 7(b) was pressurized with a cylindrical rod having a diameter of 3 mm in order to measure the pressing strength of the laser-welding sealed portion (i.e., a level of load at which the laser-welding sealed portion was broken). The results are shown in Table 2.

TABLE 2

|  | Dummy cell 3 | Comparative cell 2 |
| --- | --- | --- |
| Results | 309 N (288-333) | 234 N (221-245) |

Average (minimum-maximum)

Table 2 shows that the weld strength of each of the dummy cells 3 of the present invention is 309N, which is superior to 234 N for the comparative cells 1. The possible explanation given for Experiment 1 applies here.

Experiment 3

Dropping Test

Figure 8:
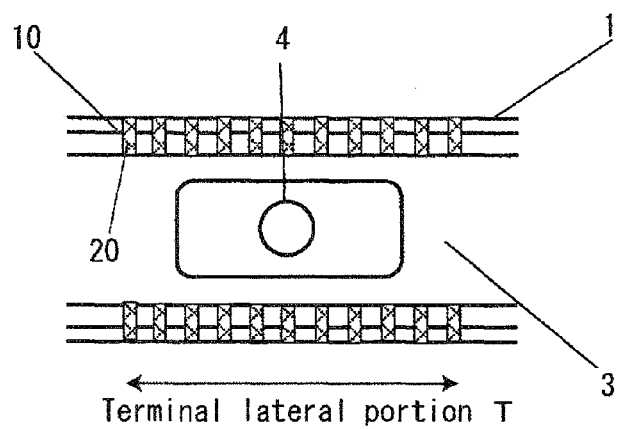
FIG. 8 is a plan view of a cell before welding in Experiment 3.

As shown in FIG. 8, over a 10 mm range of each of the terminal lateral portions, dent portions dented axially inwardly were formed on the upper end of the opening of the can, and dent grooves were formed on the periphery of the outer surface of the seal. For each of the dent portions and the dent grooves, the width L1 shown in FIG. 3 is 0.2 mm, the depth L2 is 0.1 mm, and the distance L3 between the dent portions and between the dent grooves is 1.0 mm. The seal was engaged with the opening of the can so that the outer surface of the sealing plate and the upper end of the opening of the can would be on the same plane. Then, the portion of engagement was welded with laser, thus preparing five dummy cells 4 each having a thickness of 55 mm, a width of 34 mm, and a height of 50 mm. While each of the dummy cells 4 housed an electrode assembly composed of the positive and negative electrodes and the separator, no electrolytic solution was contained in each cell.

For comparison, five comparison cells 3 were prepared each having an can without dent portions on the upper end of the opening of the can and having a seal without dent grooves on the periphery thereof.

Each cell was dropped six times each on a different one of the six faces from a height of 1.65 m onto a concrete, the six times of dropping being assumed one set. The number of sets carried out before the laser welded portion (melt mark) was broken was measured. The results are shown in Table 3.

TABLE 3

|  | Dummy cell 4 | Comparative cell 3 |
| --- | --- | --- |
| Results | 40 sets NG (32-50) | 24 sets NG (18-28) |

Average (minimum-maximum)

Table 3 shows that the impact resistance of the dummy cells 4 of the present invention is 40 sets, which is superior to 24 sets for the comparison cells 3. The possible explanation given for Experiment 1 applies here.

The cell according to the present invention finds applications in cells and batteries in general, primary or secondary, that involve sealing by laser welding. In the above-described experiments, pulse laser welding was used, and the drawings show clearly defined melt marks. In this case, in the hermetic cell according to the present invention, at least one portion of a melt mark has a top surface having a lowermost point lower in the direction of the bottom of the can than a lowermost point of the top surface of an adjacent portion of the melt mark, and the at least one portion of the melt mark has a bottom surface having a lowermost point lower in the direction of the bottom of the can than an lowermost point of a bottom surface of the adjacent portion of the melt mark. As high energy beam, the present invention may use, instead of pulse laser welding, other known welding such as using CW (Continuous Wave) laser and electron beam, in which case similar advantageous effects are obtained. In this case, the melt mark is not clearly defined as with pulse laser welding. Thus, the hermetic cell according to the present invention encompasses all the cases where at least one portion of a melt mark has a top surface having a lowermost point lower in the direction of the bottom of the can than a lowermost point of the top surface of an adjacent portion of the melt mark. The hermetic cell according to the present invention also finds applications in cylindrical cells as well as in rectangular cells.

What is claimed is:

1. A hermetic cell comprising:
   a can having an opening; and
   a seal for sealing the opening of the can, wherein:
   a portion of engagement of the seal with the opening of the can is welded with a high energy beam, thereby hermetically sealing the can;
   at least one portion of a melt mark resulting from the high energy beam welding has a top surface having a lowermost point lower in a direction of a bottom of the can than a lowermost point of a top surface of an adjacent portion of the melt mark; and
   the at least one portion of the melt mark has a bottom surface having a lowermost point lower in the direction of the bottom of the can than a lowermost point of a bottom surface of the adjacent portion of the melt mark;
   the lowermost point of the top surface of the at least one portion of the melt mark is from 0.05 to 0.2 mm lower in the direction of the bottom of the can than the lowermost point of the top surface of the adjacent portion of the melt mark; and
   the lowermost point of the bottom surface of the at least one portion of the melt mark is at least 0.1 mm lower in the direction of the bottom of the can than the lowermost point of the bottom surface of the adjacent portion of the melt mark.

2. The hermetic cell according to claim 1, wherein:
   the can is rectangular; and
   the lower portion of the melt mark is formed at least in a corner portion of the portion of engagement subjected to the high energy beam welding.

3. The hermetic cell according to claim 1, wherein:
   the can is rectangular; and
   an external electrode terminal is provided in a center portion of the seal; and
   the lower portion of the melt mark is formed at least in a terminal lateral portion (T) of the seal.

4. The hermetic cell according to claim 2, wherein:
   the can is rectangular; and
   an external electrode terminal is provided in a center portion of the seal; and
   the lower portion of the melt mark is formed at least in a terminal lateral portion (T) of the seal.

\* \* \* \* \*